(12) United States Patent
Li

(10) Patent No.: US 10,979,544 B2
(45) Date of Patent: Apr. 13, 2021

(54) CAMERA DECORATION FRAME, ELECTRONIC DEVICE HAVING THE SAME, AND MOBILE TERMINAL

(71) Applicant: Guangdong OPPO Mobile Telecommunications Corp., Ltd., Guangdong (CN)

(72) Inventor: Jie Li, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/459,235

(22) Filed: Jul. 1, 2019

(65) Prior Publication Data

US 2020/0007667 A1 Jan. 2, 2020

(30) Foreign Application Priority Data

Jul. 2, 2018 (CN) .......................... 201821039304.9

(51) Int. Cl.
*H04M 1/00* (2006.01)
*H04M 1/02* (2006.01)
*H04N 5/225* (2006.01)

(52) U.S. Cl.
CPC ........ *H04M 1/0264* (2013.01); *H04N 5/2252* (2013.01); *H04N 5/2257* (2013.01); *H04M 2250/52* (2013.01)

(58) Field of Classification Search
CPC ............ H04M 1/0264; H04M 2250/52; H04N 5/2252; H04N 5/2257
See application file for complete search history.

(56) References Cited

U.S. PATENT DOCUMENTS

2004/0110540 A1   6/2004 Sato et al.
2014/0022451 A1*  1/2014 Wang ................... H04N 5/2256
                                                                          348/375
(Continued)

FOREIGN PATENT DOCUMENTS

CN     106331261 A     1/2017
CN     107483797 A    12/2017
(Continued)

OTHER PUBLICATIONS

International search report issued in corresponding international application No. PCT/CN2019/094267, dated Oct. 8, 2019 (4 pages).
(Continued)

*Primary Examiner* — Khai M Nguyen

(57) ABSTRACT

A camera decoration frame adapted to an electronic device with a rear cover is provided. The camera decoration frame may include a decoration portion configured to fix and decorate a camera of the electronic device, a light guide portion configured to be fixedly connected to the decoration portion and a light emitting portion configured to be located inside the electronic device and emit light to illuminate the light guide portion. The light guide portion may be a continuous structure, a first partial structure of the light guide portion may be located inside the electronic device, and a second partial structure of the light guide portion may be exposed to an outside of the rear cover, the second partial structure may have a part exposed out of an outer circumferential surface of the decoration portion. The light guide portion may conduct the emitted light to outside of the rear cover.

14 Claims, 7 Drawing Sheets

(56) References Cited

U.S. PATENT DOCUMENTS

2015/0366110 A1\* 12/2015 Park .................... H04N 5/2252
                                                    348/373
2018/0047318 A1\*  2/2018 Nakamura ............. G09F 13/04

FOREIGN PATENT DOCUMENTS

| CN | 107940306 A  | 4/2018  |
|----|--------------|---------|
| CN | 207504996 U  | 6/2018  |
| CN | 108463770 A  | 8/2018  |
| CN | 208522804 U  | 2/2019  |
| JP | 2004354702 A | 12/2004 |
| KR | 20150026419 A | 3/2015 |
| WO | 2013118934 A1 | 8/2013 |

OTHER PUBLICATIONS

Extended European search report issued in corresponding European application No. 19183800, dated Nov. 14, 2019 (26 pages).
Indian Examination Report, application No. 201914026374 dated Oct. 22, 2020 (5 pages).

\* cited by examiner

CAMERA DECORATION FRAME, ELECTRONIC DEVICE HAVING THE SAME, AND MOBILE TERMINAL

CROSS-REFERENCE TO RELATED APPLICATION(S)

The present application claims foreign priority of Chinese Patent Application No. 201821039304.9, filed on Jul. 2, 2018, the entire contents of which are hereby incorporated by reference.

TECHNICAL FIELD

The present disclosure relates to the field of electronic devices, and in particular to a camera decoration frame and an electronic device thereof.

BACKGROUND

A conventional electronic device usually needs to set a hole on a surface of the screen, incorporating a breathing lamp assembly, which impacts the screen occupation ratio.

SUMMARY

According to an aspect of the present disclosure, a camera decoration frame may be adapted to an electronic device with a rear cover and may include a decoration portion configured to fix and decorate a camera of the electronic device; a light guide portion, configured to be fixedly connected to the decoration portion, wherein the light guide portion is a continuous structure, a first partial structure of the light guide portion is located inside the electronic device, and a second partial structure of the light guide portion is exposed to an outside of the rear cover, wherein the second partial structure has a part exposed out of an outer circumferential surface of the decoration portion; and a light emitting portion configured to be located inside the electronic device and emit light to illuminate the light guide portion, wherein the light guide portion conducts the emitted light to outside of the rear cover.

According to another aspect of the present disclosure, an electronic device may include a rear cover, which defines a through hole; and a camera decoration frame configured to pass through the through hole. The camera decoration frame may include a decoration portion configured to fix and decorate a camera of the electronic device; a light guide portion, configured to be fixedly connected to the decoration portion, wherein the light guide portion is a continuous structure, a first partial structure of the light guide portion is located inside the electronic device, and a second partial structure of the light guide portion is exposed to an outside of the rear cover, wherein the second partial structure has a part exposed out of an outer circumferential surface of the decoration portion; and a light emitting portion configured to be located inside the electronic device and emit light to illuminate the light guide portion, wherein the light guide portion conducts the emitted light to outside of the rear cover.

According to still another aspect of the present disclosure, a mobile terminal may include a front shell; a back shell connected to the front shell and defining a through hole; a screen embedded in the front shell and covering the back shell; a breathing lamp assembly corresponding to the through hole, and a camera decoration element. The breathing lamp assembly may include a light guide element including an engaging portion engaged in the through hole and a protruding portion protruding beyond the through hole, the light guide element having an upper surface and a lower surface, wherein a bending portion extending from the lower surface; and a light emitting element positioned on an end of the bending portion and configured to emit light to illuminate the light guide element. The camera decoration element may be attached on the upper surface of the light guide element and extending beyond the through hole.

BRIEF DESCRIPTION OF DRAWINGS

To further clarify the embodiments of the present disclosure and the technical solutions of the current available techniques in the art, brief descriptions of appended figures are provided. Apparently, following described figures reflect only some of the embodiments for the present disclosure. The skilled personnel in the art should be able to obtain other figures based on the provided figures, without any creative endeavor.

DETAILED DESCRIPTION

Figure 1:
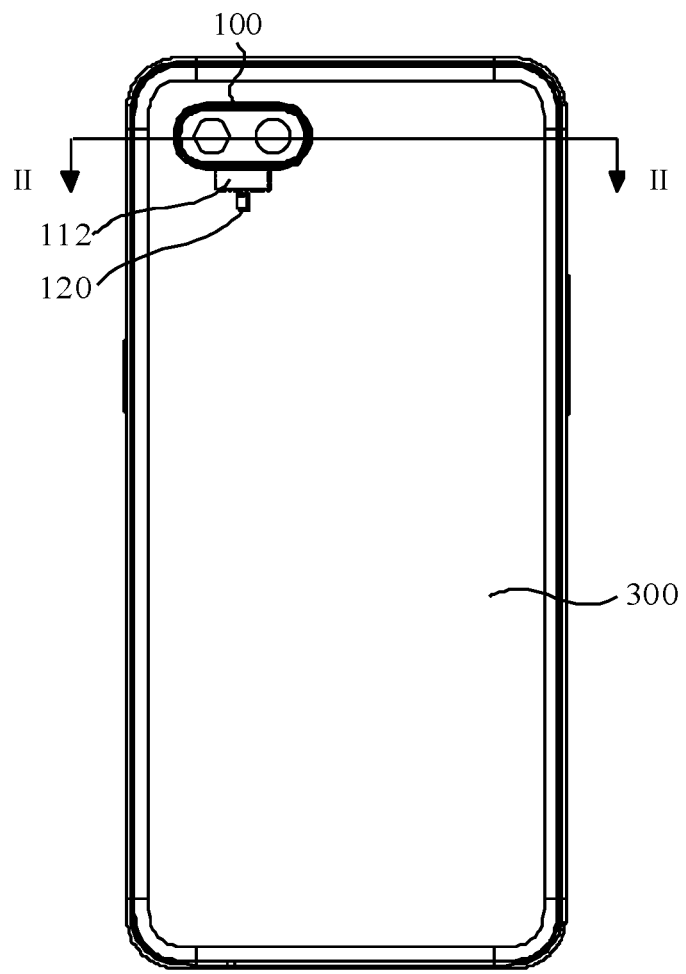
FIG. 1 is a rear view of an electronic device in one embodiment.

Referring to the appended figures, the present disclosure is to provide more comprehensive description for clarity. Appended figures illustrate optimal embodiments of the present disclosure. However, the present disclosure can be achieved in various forms, and should not be limited to the embodiments in the present disclosure. Providing these embodiments aims to thoroughly understand the present disclosure.

A "terminal device" as used herein may refer to a device configured to receive and/or transmit a communication signal by including, but being not limited to any one or more of the following connection methods.

(1) A connection method by a wired line, such as a public switched telephone network (PSTN), a digital subscriber line (DSL), a digital cable, and a direct cable connection.

(2) A connection method by a wireless interface, such as a cellular network, a wireless local area network (WLAN), a digital television network such as a DVB-H network, a satellite network, and an AM-FM broadcast transmitter.

A terminal device configured to receive and/or transmit a communication signal by the wireless interface may be referred as a "mobile terminal". The mobile terminal may include, but may be not limited to the following electronic apparatuses.

(1) A satellite or cellular radiotelephone telephone.

(2) A terminal of personal communications system (PCS) that may combine cellular radiotelephone with data processing, fax, and data communication capabilities.

(3) A radiotelephone, a pager, an internet/intranet access, a web browser, a notepad, a calendar, a personal digital assistant (PDA) equipped with a global positioning system (GPS) receiver.

(4) A conventional laptop and/or a palm receiver.

(5) A conventional laptop and/or a palm-type radiotelephone transceiver and the like.

According to an aspect of the present disclosure, a camera decoration frame may be adapted to an electronic device with a rear cover. The camera decoration frame may include a decoration portion configured to fix and decorate a camera of the electronic device; a light guide portion configured to be fixedly connected to the decoration portion, wherein the light guide portion is a continuous structure, a first partial structure of the light guide portion is located inside the electronic device, and a second partial structure of the light guide portion is exposed to an outside of the rear cover, wherein the second partial structure has a part exposed out of an outer circumferential surface of the decoration portion; and a light emitting portion configured to be located inside the electronic device and emit light to illuminate the light guide portion, wherein the light guide portion conducts the emitted light to outside of the rear cover.

In one embodiment, the light guide portion may include a first part and a second part, wherein the first part is fixedly connected to the decoration portion and has at least a partial structure exposed to the outside of the rear surface; and the second part extends from a bottom surface of the first part and is configured to be located inside the electronic device.

In one embodiment, the decoration portion may include an outer circumferential surface and an inner circumferential surface, and the first part may be a stadium-shaped structure, including an outer surface and an inner surface, wherein the outer surface may be on one side of the outer circumferential surface of the decoration portion, the inner surface may be on one side of the inner circumferential surface of the decoration portion, the outer and inner surfaces may be continuous surfaces; and at least a part of the outer surface may be exposed from the rear cover.

In one embodiment, the decoration portion may include an outer circumferential surface and an inner circumferential surface, and the first part may be a stadium-shaped structure, including an outer surface and an inner surface, wherein the outer surface may be located on a side of the outer circumferential surface of the decoration portion, and may be at a same level with the outer circumferential surface; the inner surface may be located on a side of the inner circumferential surface of the decoration portion, and may be exposed out of or at a same level with the inner circumferential surface; the inner surface may be continuous, and the outer surface comprises continuous and discontinued surfaces, and may have at least a partial surface exposed out of the rear cover.

In one embodiment, the decoration portion may include an outer circumferential surface and an inner circumferential surface, and the first part may be a stadium-shaped structure, including an outer surface and an inner surface, wherein the outer surface may be located on a side of the outer circumferential of the decoration portion, and may be at a same level with the outer circumferential surface; the inner surface may be located on a side of the inner circumferential surface of the decoration portion, and may be exposed out of the inner circumferential surface; the inner surface may be a continuous surface, the outer surface may include discontinued surfaces, and have at least a partial surface exposed out of the rear cover.

In one embodiment, the discontinued surfaces may be cubic, circular, and curved surfaces, and are distributed dispersively.

In one embodiment, the second part of the light guide portion may be an "L"-shaped structure and an end face of the second part may face the light emitting portion.

In one embodiment, the decoration portion may include a bottom end surface and an outer circumferential surface, and the light guide portion may include a top surface, wherein the top surface may be a plane and fixedly connected to the bottom end surface.

In one embodiment, the decoration portion may include a bottom end surface and an outer circumferential surface, and the light guide portion may include a top surface, wherein the top surface may be "L" shaped and fixedly connected to the bottom end surface and the outer circumferential surface.

In one embodiment, the light guide portion may be made of a translucent acrylic material, and the light emitting portion may include a light emitting diode.

According to another aspect of the present disclosure, an electronic device may include a rear cover, which defines a through hole; and a camera decoration frame configured to pass through the through hole, which may include a decoration portion configured to fix and decorate a camera of the electronic device, a light guide portion configured to be fixedly connected to the decoration portion, wherein the light guide portion may be a continuous structure, a first partial structure of the light guide portion may be located inside the electronic device, and a second partial structure of the light guide portion may be exposed to an outside of the rear cover, wherein the second partial structure may have a part exposed out of an outer circumferential surface of the decoration portion; and a light emitting portion configured to be located inside the electronic device and emit light to illuminate the light guide portion, wherein the light guide portion conducts the emitted light to outside of the rear cover.

In one embodiment, the light guide portion of the camera decoration frame may include a first part and a second part, wherein the first part may be fixedly connected to the decoration portion and have at least a partial structure exposed to the outside of the rear cover; and the second part may extend from the bottom surface of the first part and may be configured to be located inside the electronic device.

In one embodiment, the decoration portion of the camera decoration frame may include an outer circumferential surface and an inner circumferential surface, and the first part of the light guide portion may be a stadium-shaped structure, including an outer surface and an inner surface, wherein the outer surface may be located on a side of the outer circumferential surface of the decoration portion, and may be at a same level with the outer circumferential surface; the inner surface may be located on a side of the inner circumferential surface of the decoration portion, and may be exposed out of or at a same level with the inner circumferential surface; the inner surface may be continuous, and the outer surface may include continuous and discontinued surfaces and have at least a partial surface exposed from the rear cover.

In one embodiment, the light guide portion is made of a translucent acrylic material, the light emitting portion may include a light emitting diode.

According to still another aspect of the present disclosure, a mobile terminal may include a front shell, a back shell connected to the front shell and defining a through hole, a screen embedded in the front shell and covering the back shell, a breathing lamp assembly corresponding to the through hole, and a camera decoration element attached on the upper surface of the light guide element and extending beyond the through hole. The breathing lamp assembly may include a light guide element comprising an engaging portion engaged in the through hole and a protruding portion protruding beyond the through hole, the light guide element having an upper surface and a lower surface, wherein a bending portion extending from the lower surface, and a light emitting element positioned on an end of the bending portion and configured to emit light to illuminate the light guide element.

In one embodiment, the engaging portion and the protruding portion of the light guide element may be continuous structures, the protruding portion may have a partial structure exposed out of an outer circumferential surface of the camera decoration element. The bending portion of the light guide element may be configured to be located inside a chamber defined by the front shell and the back shell and have a first part extended from an end surface of the engaging portion, and a second part configured to be perpendicular to the first part.

In one embodiment, one end of the light emitting element may be arranged to face the end of the bending portion, and the other end of the light emitting element may be configured to connect with a circuit board inside the chamber.

In one embodiment, the light guide element may be made of a translucent acrylic material and the light emitting element may include a light emitting diode.

In one embodiment, the light guide element is made of a translucent material, adapted to transmit light and provide unobstructed light paths. The light emitting element may be configured to emit light when the mobile terminal receives messages, wherein the light may be configured to be conducted out of the mobile terminal through the light guide element, so that the camera decoration element may illuminate.

Figure 2:
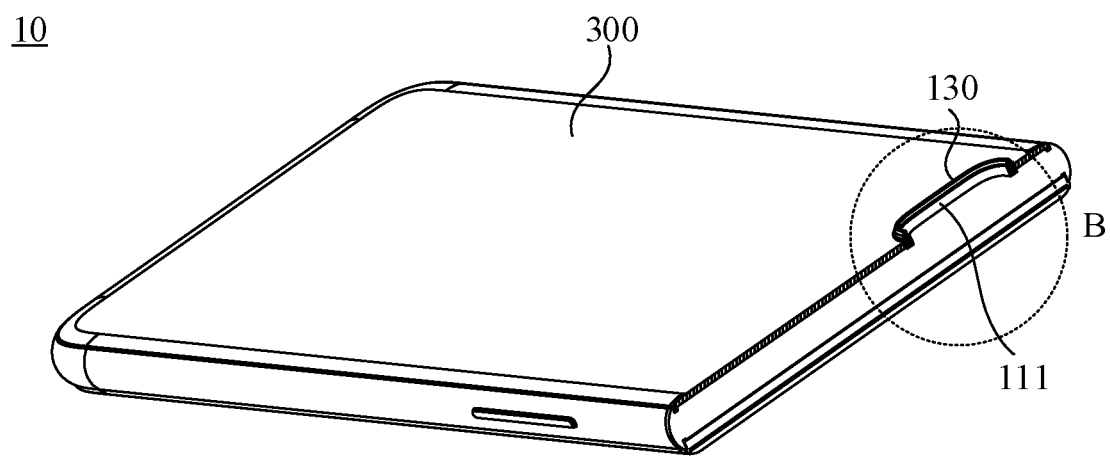
FIG. 2 is a sectional view along line II-II of the electronic device shown in FIG. 1.
Figure 3:
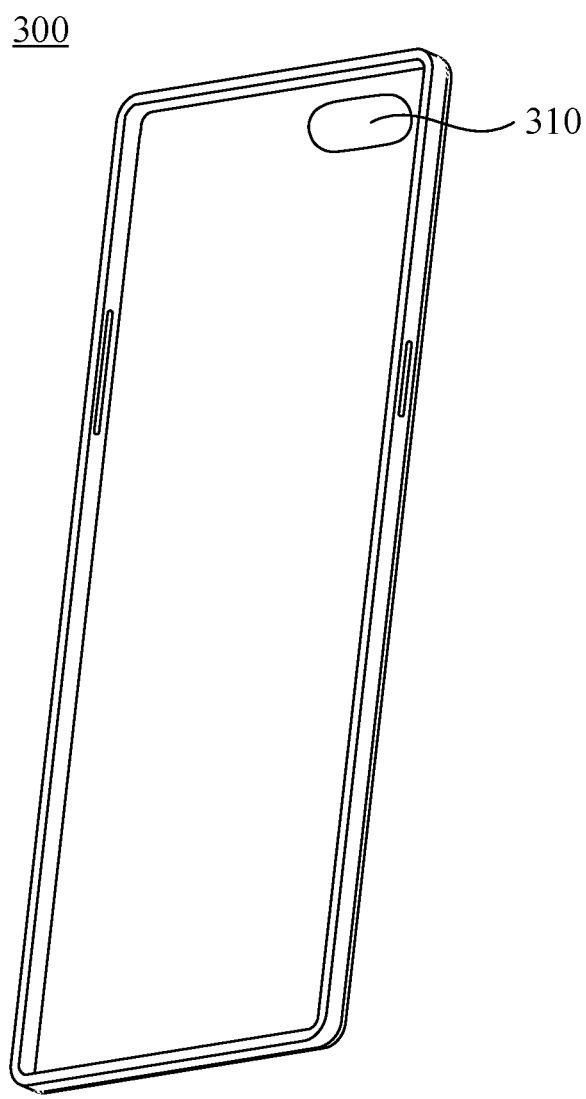
FIG. 3 is a perspective view of a rear cover of the electronic device shown in FIG. 1.

Referring to FIG. 1 to FIG. 3, a camera decoration frame 100 is provided, which may include a decoration portion 130, a light guide portion 110 (shown in FIG. 5), and a light emitting portion 120. The decoration portion 130 may be an enclosed structure, which may be stadium shaped, elliptical, rounded rectangle, and the like, the exact structure of the decoration portion 130 is not limited in the present disclosure. The decoration portion 130 may include an outer circumferential surface, an inner circumferential surface, and a bottom end surface. The light guide portion 110 may be fixed to the bottom of the decoration portion 130, and fixed with the decoration portion 130 to form an integrative structure. At least a part of the light guide portion 110 may be exposed from the rear surface 300. The light guide portion 110 and light emitting portion 120 form a breathing lamp assembly, meaning that the breathing lamp assembly may be integrated into the camera decoration frame 100. When the electronic device 10 receives text messages and missed calls, electric current passes through the light emitting portion 120 to illuminate, wherein the illumination can be visible through the bottom end of the decoration portion 130, to notice users and be a decoration.

Referring to FIG. 1 and FIG. 2, in one embodiment, the camera decoration frame 100 is located on the side of the rear surface 300, avoiding establishment of a hole on the side of the screen, which may increase the screen occupation ratio of the electronic device 10.

Referring to FIG. 4 to FIG. 7, in one embodiment, the light guide portion 110 may include a first part 111 and a second part 112. The first part 111 may be an enclosed structure or an open structure, but must be a continuous structure, so that the light path cannot be interrupted. To further understand it, when the first part 111 is an enclosed structure, the first part 111 is not interrupted; when the first part 111 is an open structure, the beginning of the first part 111 connects with the end of the first part 111 to form a continuous structure, which ensures light transmission. The first part 111 may have the same shape as that of the decoration portion 130, which may be stadium shaped or in other structures, and is not limited in the present disclosure.

Figure 9:
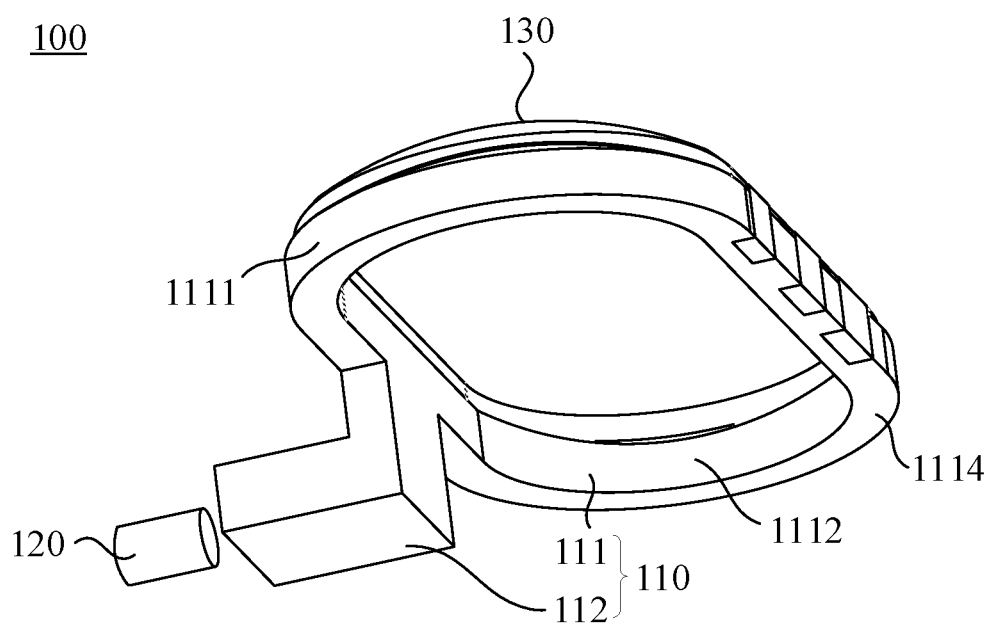
FIG. 9 is a perspective view from another angle of the camera decoration frame shown in FIG. 8.

The first part 111 may include an outer surface 1111, an inner surface 1112, a top surface 1113 and a bottom surface 1114 (illustrated in FIG. 9). The outer surface 1111 and the inner surface 1112 are oppositely disposed in parallel or nonparallel. The outer surface 1111 is on the side of the outer circumferential surface of the decoration portion 130; the inner surface 1112 is on the side of the inner circumferential surface of the decoration portion 130. The top surface 1113 and bottom surface 1114 are oppositely disposed. The top surface 1113 may be fixed with and connected to the bottom end surface of the decoration portion 130. The connection between the first part 111 of the light guide portion 110 and the decoration portion 130 may be achieved by adhesion or in other forms, and is not limited in the present disclosure. The second part 112 extends from the bottom surface 1114 and can be an "L"-shaped structure.

In one embodiment, the light emitting portion 120 is a light emitting diode (LED), and may be placed at the end portion of the second part 112. The light emitting portion 120 may be connected to the circuit board in the electronic device 10. When electric current passes through the light emitting portion 120 to illuminate, the light may be transmitted through the light guide portion 110, which allows the entire light guide portion 110 to illuminate. Depending on different alerting modes, the light emitting portion 120 may be set to illuminate with various brightness, in various colors, and in various distribution patterns, such as the light emitting portion 120 may flash, change the brightness gradually, and change colors, and the like. The present disclosure will not embody all the illuminating modes of the light emitting portion 120.

Figure 4:
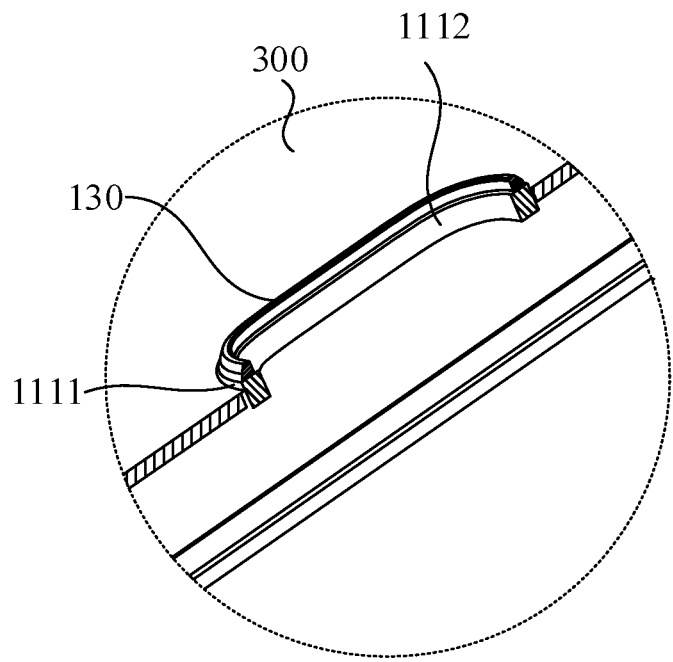
FIG. 4 is an enlarged view of circle B of the electronic device shown in FIG. 2.

Referring to FIG. 2 and FIG. 4, in one embodiment, the decoration portion 130 may be located outside of the rear surface 300, wherein the first part 111 may be locked within the through hole 310, in such a way, a partial structure of the first part 111 may be located outside the electronic device 10, and another partial structure of the first part 111 may be located inside the electronic device 10. A part of the outer surface 1111 may be exposed to the outside from the rear surface 300, and another part of the outer surface 1111 may be located within the electronic device 10. The second part 112 and the light emitting portion 120 may be located within the electronic device 10. When electric current passes through the light emitting portion 120, the light emitted from the light emitting portion 120 illuminates the light guide portion 110, and is transmitted to the outside of the rear surface 300 through the light guide portion 110, and the light guide portion 110 may be observed as illuminating. When the electronic device 10 is observed from the outside, the bottom of the decoration portion 130 may illuminate, shown as a ring-shaped light, serving as a message alerting function, and providing the rear surface 300 a more artistic appearance.

Figure 5:
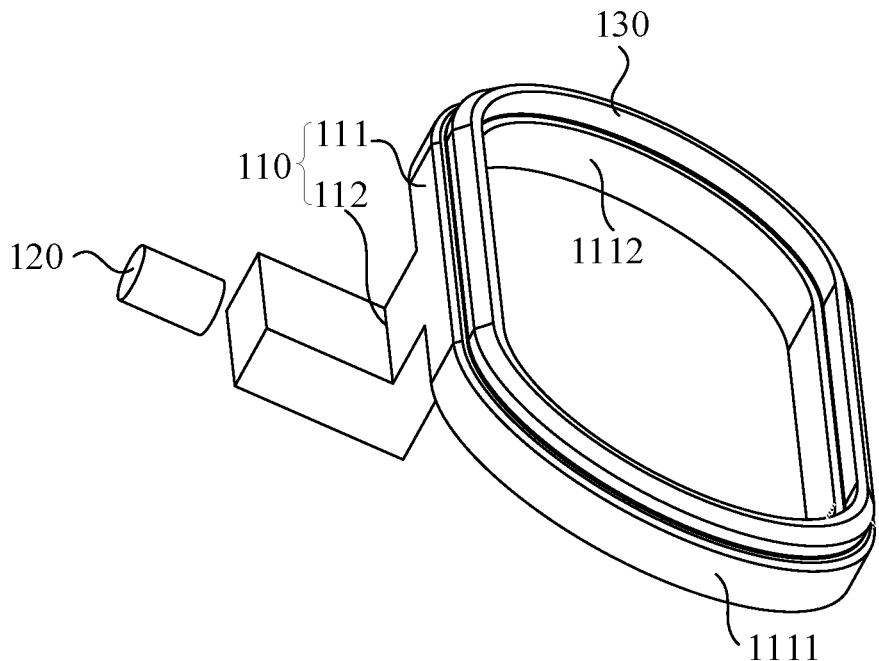
FIG. 5 is an explored, isometric view of a camera decoration frame of the electronic device shown in FIG. 1 in one embodiment.
Figure 6:
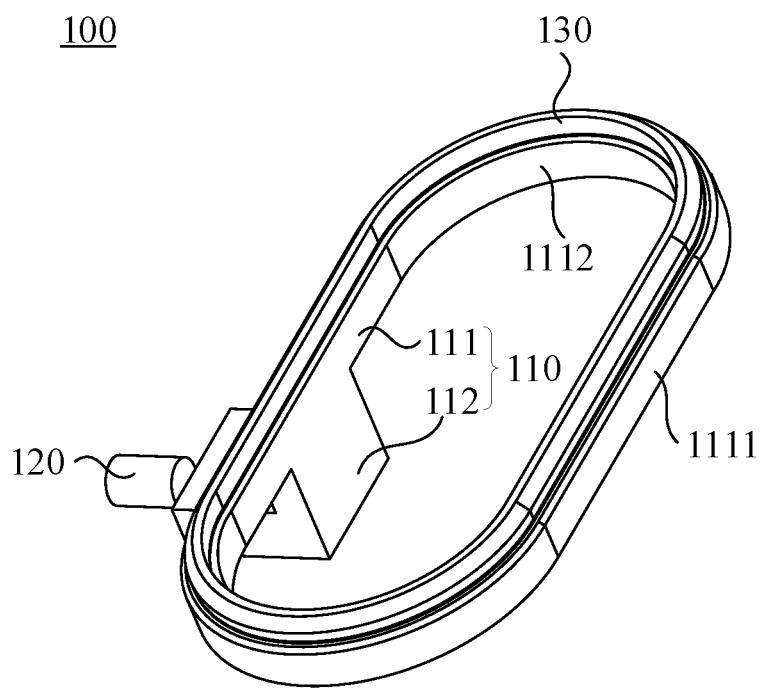
FIG. 6 is similar to FIG. 5, but shown from another angle of the camera decoration frame shown in FIG. 5.
Figure 7:
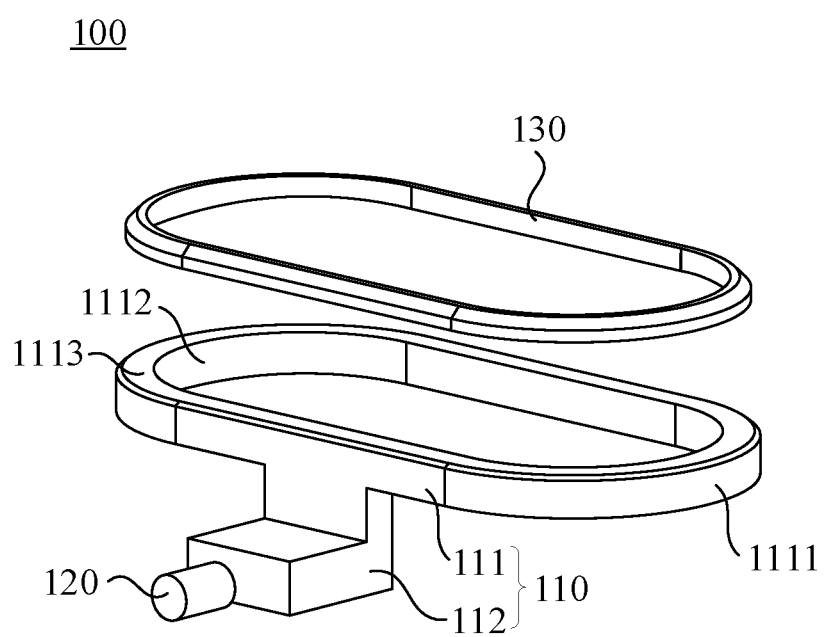
FIG. 7 is an exploded, isometric view of the camera decoration frame shown in FIG. 5.

Referring to FIG. 5 to FIG. 7, in one embodiment, the first part 111 may be in a regular stadium-shaped structure, wherein the outer surface 1111 and the inner surface 1112 of the first part 111 may be continuous surfaces. The top surface 1113 may be a plane, and fixed with the bottom end surface of the decoration portion 130. A thickness of the decoration portion 130 may be less than or equal to that of the first part 111; so that the outer surface 1111 may be exposed to the outside of, or at the same level of the outer circumferential surface of the decoration portion 130, the inner surface 1112 may be exposed to the outside of, or at the same level of the inner circumferential surface of the decoration portion 130. At least a part of the outer surface 1111 is exposed to the outside of the rear surface 300. The first part 111 may be in contact with only the bottom end surface of the decoration portion 130. When electric current passes through the light emitting portion 120, a ring-shaped light at the bottom of the decoration portion 130 illuminates. In another embodiment, a cross section of the top surface 1113 is "L"-shaped, wherein the top surface 1113 closely fits with the bottom end surface and the outer circumferential surface of the decoration portion 130. When electric current passes through the light emitting portion 120, the bottom and the outer side of the decoration portion 130 illuminate simultaneously.

Figure 8:
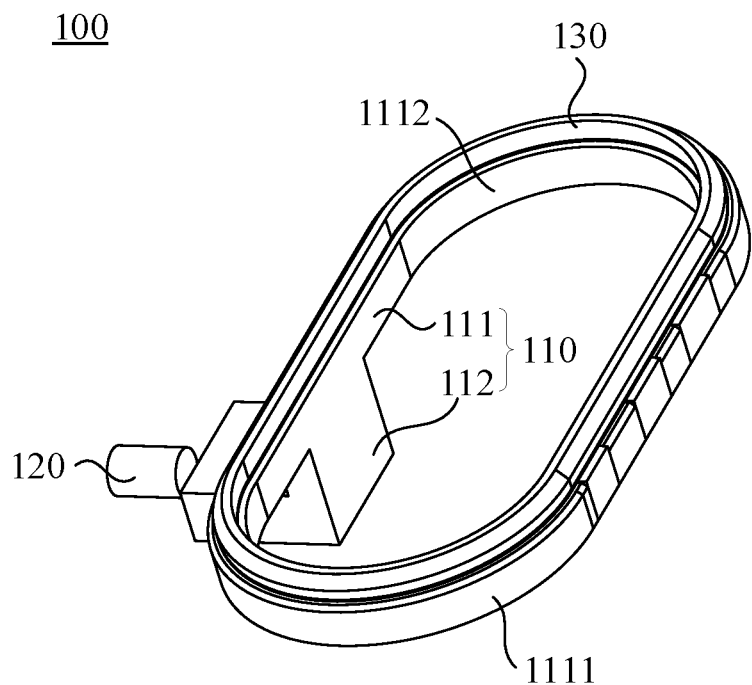
FIG. 8 is a perspective view of the camera decoration frame of the electronic device shown in FIG. 1 in another embodiment.
Figure 10:
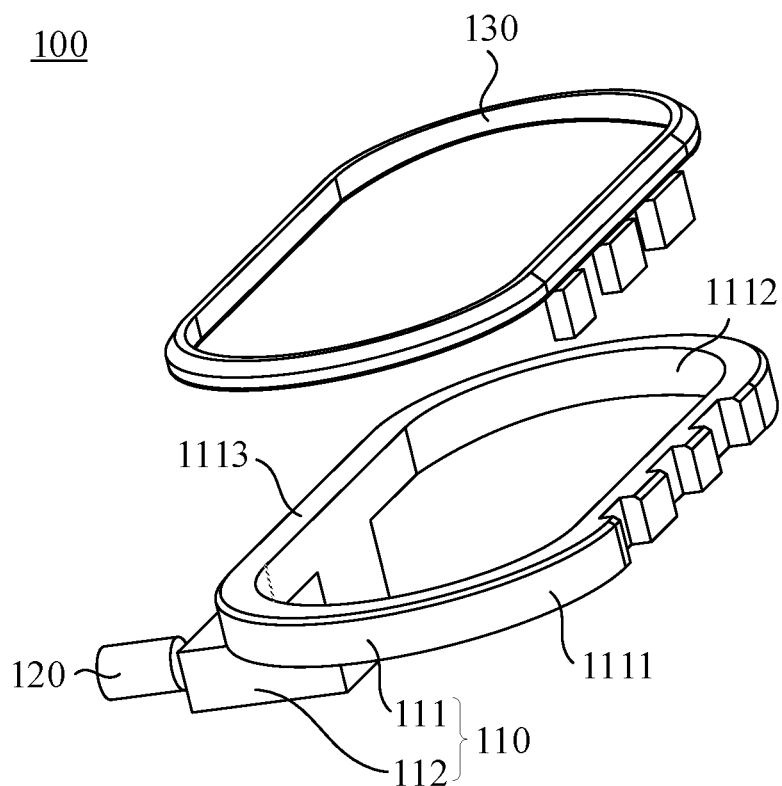
FIG. 10 is an exploded, isometric view of the camera decoration frame shown in FIG. 8.

Referring to FIG. 8 to FIG. 10, in one embodiment, the first part 111 may be in a stadium-shaped structure. The outer surface 1111 is located on the side of, and at the same level of the outer circumferential surface of the decoration portion 130, wherein the outer surface 1111 may include continuous surfaces and discontinued surfaces. The inner surface 1112 may be located on the side of the inner circumferential surface of the decoration surface 130, and may be exposed to the outside of, or at the same level of the inner circumferential surface. The inner surface 1112 may be a continuous surface. At least a part of the outer surface 1111 may be exposed to the outside of the rear surface 300. In particular, a partial structure of the decoration portion 130 may be in contact with the top surface 1113; and another part of the structure may be embedded inside the light guide portion 110, and the another part of the structure together with the outer surface 1111 may be located at the outermost position of the light guide portion 110. The appearance may be that the outer surface 1111 of the light guide portion 110 has discontinued surfaces, and the outer surface 1111 is at the same level of the outer circumferential surface of a partial structure of the decoration portion 130. Referring to FIG. 9 and FIG. 10, a part of the outer surface 1111 may be a continuous surface, another part of the outer surface 1111 may be discontinuous, and at least a part of the outer surface 1111 may be exposed to the outside of the rear surface 300. Referring to FIG. 10, the decoration portion 130 may have structures embedded inside the first part 111, wherein the embedded structures may be three cubes, and are for the purpose of demonstration of the present disclosure only. The structures of the decoration portion 130 embedded inside the first part 111 may be curved cubes or in other structures. The number of the embedded structures may be varied, and should not be limited by the present disclosure.

Figure 11:
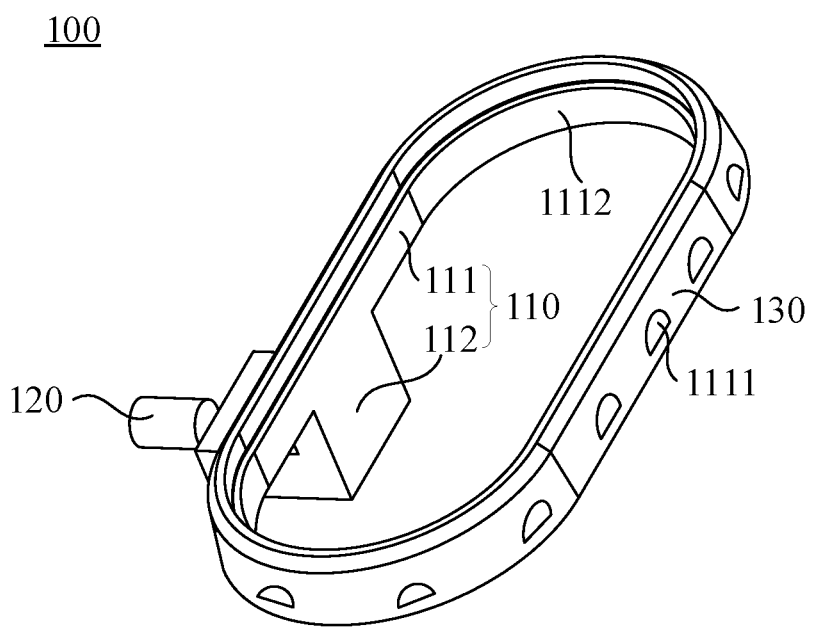
FIG. 11 is a perspective view of the camera decoration frame of the electronic device shown in FIG. 1 in another embodiment.

Referring to FIG. 11, in one embodiment, the inner surface 1112 of the first part 111 may be exposed to the outside of the inner circumferential surface of the decoration portion 130, the outer surface 1111 may be at the same level of the outer circumferential surface of the decoration portion 130. The decoration portion 130 may be located at the outer side of the first part 111, and has a hole along a direction of thickness, wherein the hole may be circular, squared, and arc shaped, the exact shape of the hole should not be limited by the present disclosure. The hole is located at the outer side of the rear surface 300, and is not covered by the rear surface 300. Partial structure of the first part 111 may be located inside the hole of the decoration portion 130, and the outer surface 1111 may be at the same level of the outer circumferential surface of the decoration portion 130. In such a configuration, the outer surface 1111 may be discontinuous. The inner surface 1112 may be a continuous surface to allow an unobstructed light path. When electric current passes through the light emitting portion 120, the light transmits through the light guide portion 110. It may be observed that the hole of the decoration portion 130 illuminates, providing an artistic appearance of the rear surface 300.

In one embodiment, the decoration portion 130 may be made of metal and other materials, the light guide portion 110 may be made of a translucent acrylic material, which is also called polymethyl methacrylate (PMMA) or plastic glass as a common name. When the light guide portion 110 is manufactured, the decoration portion 130 may be placed into a mould, melted acrylic material is poured into the mould, so that the light guide portion 110 may be in close contact with the decoration portion 130, and the shape of the light guide portion 110 completely may fit with the decoration portion 130. In another embodiment, the manufactured light guide portion 110 may be fixed with the decoration portion 130 by adhesion.

In one embodiment, an electronic device 10 is provided, and may be, but not limited to, a mobile phone, a tablet computer, or the like. The electronic device 10 may include a camera decoration frame 100 and a rear cover 300, wherein the rear cover 300 defines a through hole 310, which allows the camera decoration frame 100 to pass through.

In one embodiment, a mobile terminal 10 is provided and may include a back shell 300, which may contain a breathing lamp assembly, and a camera decoration frame 100. The back shell may define a through hole, which may include a light guide portion 110 and a light emitting portion 120, wherein the light guide portion 110 and the light emitting portion 120 may function as a breathing lamp assembly in accompany. The present disclosure integrates the light guide portion 110 and the light emitting portion 120 into the camera decoration frame 100, which means a breathing lamp assembly is integrated into the decoration frame 100 of the rear camera, avoiding the establishment of hole for the breathing lamp assembly on the screen side of the electronic device 10, and increasing the screen occupation ratio of the electronic device 10. The injection of the acrylic material into the bottom of the camera decoration frame 100 enables the camera decoration frame 100 to be photo-permeable and guide light. When message alerts occur, the camera decoration portion 100 may illuminate for alerting and decoration.

Technical features of the above embodiments may be applied in any combination. In order to present a concise description, all the possible combinations of the technical features of the above embodiments are not described in the present disclosure. However, the present disclosure is to provide all the combinations, which do not have a contradiction.

The above-mentioned embodiments demonstrate some embodiment means of the present disclosure, and are described in details and in specific, but should not restrict the scope of the present disclosure. Without departing from the conception of the present disclosure, skilled personnel in the art may be able to make transformation and improvement of the present disclosure within the scope. Therefore, the scope of the present disclosure is defined by the claims.

What is claimed is:

1. A camera decoration frame adapted to an electronic device with a rear cover, the camera decoration frame comprising:
   a decoration portion configured to fix and decorate a camera of the electronic device;
   a light guide portion, configured to be fixedly connected to the decoration portion, wherein the light guide portion is a continuous structure, a first partial structure of the light guide portion is located inside the electronic device, and a second partial structure of the light guide portion is exposed to an outside of the rear cover, wherein the second partial structure has a part exposed out of an outer circumferential surface of the decoration portion,
   wherein the light guide portion further comprises a first part and a second part, the first part is fixedly connected to the decoration portion and has at least a partial structure exposed to the outside of the rear surface, the second part extends from a bottom surface of the first part and is configured to be located inside the electronic device; and
   a light emitting portion configured to be located inside the electronic device and emit light to illuminate the light guide portion, wherein the light guide portion conducts the emitted light to outside of the rear cover.

2. The camera decoration frame according to claim 1, wherein
   the decoration portion comprises an outer circumferential surface and an inner circumferential surface; and
   the first part is in a stadium-shaped structure, comprising an outer surface and an inner surface, wherein the outer surface is on one side of the outer circumferential surface of the decoration portion, the inner surface is on one side of the inner circumferential surface of the decoration portion, the outer and inner surfaces are continuous surfaces; and at least a part of the outer surface is exposed from the rear cover.

3. The camera decoration frame according to claim 1, wherein the decoration portion comprises an outer circumferential surface and an inner circumferential surface; and the first part is a stadium-shaped structure, comprising an outer surface and an inner surface, wherein the outer surface is located on a side of the outer circumferential surface of the decoration portion, and is at a same level with the outer circumferential surface; the inner surface is located on a side of the inner circumferential surface of the decoration portion, and is exposed out of or at a same level with the inner circumferential surface; and the inner surface is continuous, and the outer surface comprises continuous and discontinued surfaces, and has at least a partial surface exposed out of the rear cover.

4. The camera decoration frame according to claim 3, wherein the discontinued surfaces comprise cubic, circular, and curved surfaces, and are distributed dispersively.

5. The camera decoration frame according to claim 1, wherein
   the decoration portion comprises an outer circumferential surface and an inner circumferential surface, and
   the first part is in a stadium-shaped structure, comprising an outer surface and an inner surface, wherein the outer surface is located on a side of the outer circumferential of the decoration portion, and is at a same level with the outer circumferential surface; the inner surface is located on a side of the inner circumferential surface of the decoration portion, and is exposed out of the inner circumferential surface; and the inner surface is a continuous surface, and the outer surface comprises discontinued surfaces, and has at least a partial surface exposed out of the rear cover.

6. The camera decoration frame according to claim 5, wherein the discontinued surfaces comprise cubic, circular, and curved surfaces, and are distributed dispersively.

7. The camera decoration frame according to claim 1, wherein the second part is an "L"-shaped structure, and an end face of the second part faces the light emitting portion.

8. The camera decoration frame according to claim 1, wherein
   the decoration portion comprises a bottom end surface and an outer circumferential surface; and
   the light guide portion comprises a top surface, wherein the top surface is a plane, and is fixedly connected to the bottom end surface.

9. The camera decoration frame according to claim 1, wherein
   the decoration portion comprises a bottom end surface and an outer circumferential surface; and
   the light guide portion comprises a top surface, wherein the top surface is "L" shaped, and is fixedly connected to the bottom end surface and the outer circumferential surface.

10. The camera decoration frame according to claim 1, wherein:
    the light guide portion comprises a translucent acrylic material; and
    the light emitting portion comprises a light emitting diode.

11. An electronic device, comprising:
    a rear cover, which defines a through hole; and
    a camera decoration frame, configured to pass through the through hole, comprising:
      a decoration portion, configured to fix and decorate a camera of the electronic device;
      a light guide portion, configured to be fixedly connected to the decoration portion, wherein the light guide portion is a continuous structure, a first partial structure of the light guide portion is located inside the electronic device, and a second partial structure of the light guide portion is exposed to an outside of the rear cover through the through hole of the rear cover, wherein the second partial structure has a part exposed out of an outer circumferential surface of the decoration portion; and
      a light emitting portion configured to be located inside the electronic device and emit light to illuminate the light guide portion, wherein the light guide portion conducts the emitted light to outside of the rear cover.

12. The electronic device according to claim 11, wherein the light guide portion of the camera decoration frame comprises a first part and a second part, wherein the first part is fixedly connected to the decoration portion, and has at least a partial structure exposed to the outside of the rear cover; and the second part extends from the bottom surface of the first part, and is configured to be located inside the electronic device.

13. The electronic device according to claim 12, wherein the decoration portion of the camera decoration frame comprises an outer circumferential surface and an inner circumferential surface; and the first part of the light guide portion is in a stadium-shaped structure, comprising an outer surface and an inner surface, wherein the outer surface is located on a side of the outer circumferential surface of the decoration portion, and is at a same level with the outer circumferential surface; the inner surface is located on a side of the inner circumferential surface of the decoration portion, and is exposed out of or at a same level with the inner circumferential surface; and the inner surface is continuous, and the outer surface comprises continuous and discontinued surfaces, and has at least a partial surface exposed from the rear cover.

14. The electronic device according to claim 11, wherein:

the light guide portion comprises a translucent acrylic material; and the light emitting portion comprises a light emitting diode.

\* \* \* \* \*